US012771759B2

(12) United States Patent
Ostrovsky et al.

(10) Patent No.: US 12,771,759 B2
(45) Date of Patent: Oct. 20, 2026

(54) EDGE SIDE REAL-TIME INTERNATIONALIZATION FRAMEWORK

(71) Applicant: Dell Products L.P., Round Rock, TX (US)

(72) Inventors: Daniel Ostrovsky, Beit Arye (IL); Eliyahu Rosenes, Bet Shemesh (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/882,925

(22) Filed: Sep. 12, 2024

(65) Prior Publication Data

US 2026/0075120 A1 Mar. 12, 2026

(51) Int. Cl.
*H04L 67/5681* (2022.01)
*H04L 67/60* (2022.01)

(52) U.S. Cl.
CPC .......... *H04L 67/5681* (2022.05); *H04L 67/60* (2022.05)

(58) Field of Classification Search
None
See application file for complete search history.

(56) References Cited

U.S. PATENT DOCUMENTS

| | | | | |
|---|---|---|---|---|
| 11,115,450 | B2 * | 9/2021 | Braness | H04L 65/61 |
| 2014/0074963 | A1 * | 3/2014 | Reeser | H04L 67/56 709/216 |
| 2017/0316599 | A1 * | 11/2017 | Giunio-Zorkin | G06T 15/20 |
| 2019/0327329 | A1 * | 10/2019 | Kouru | H04L 67/06 |
| 2020/0372256 | A1 * | 11/2020 | Ashbacher | H04N 21/812 |
| 2023/0209113 | A1 * | 6/2023 | Mang | H04L 41/0654 725/144 |

* cited by examiner

*Primary Examiner* — Mohamed Ibrahim
(74) *Attorney, Agent, or Firm* — WOMBLE BOND DICKINSON (US) LLP

(57) ABSTRACT

Methods and systems for providing computer implemented services are disclosed. To provide the services, information may be distributed. To distribute information, unavailable information may be preferentially generated near requestors of the information rather than distributing existing copies of the information over longer distances. To generate the requested information, existing copies of other information may be modified to obtain local copies of the requested information. The newly generated information near the requestor may then be used to service the request.

20 Claims, 5 Drawing Sheets

EDGE SIDE REAL-TIME INTERNATIONALIZATION FRAMEWORK

FIELD

Embodiments disclosed herein relate generally to data management. More particularly, embodiments disclosed herein relate to distribution of data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
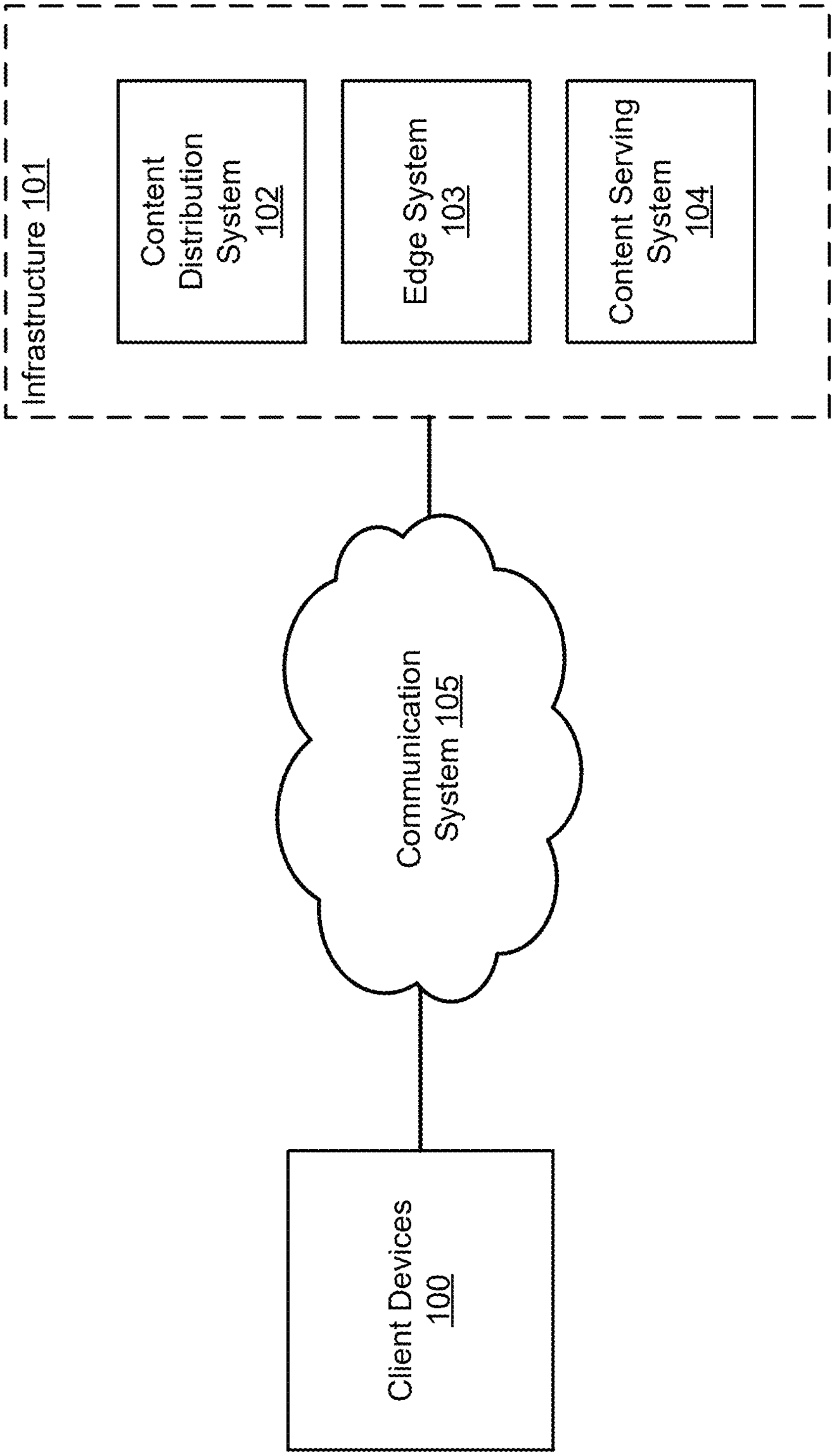
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer-implemented services. To provide the computer implemented services, information may be distributed and used in the services.

To facilitate distribution of the information, distributed infrastructure may be utilized. The distributed infrastructure may include serving systems (e.g., part of data centers) and content distribution systems (e.g., near-edge infrastructure). The content distribution systems may cache copies of information (e.g., content) and use the cached information to service information requests. The serving systems may store primary copies of information.

When requests for information that is not cached are received by the content distribution systems, the infrastructure may attempt to dynamically generate the requested information near the requesting device. If successfully generated, the generated information may be used to service the request.

By doing so, a system in accordance with an embodiment may provide a higher throughput rate for computer implemented services by reducing use of network bandwidth for information distribution. Thus, embodiments disclosed herein may address, among others, the technical problem of limitations on bandwidth and latency in distributed systems. The disclosed embodiments may address at least this technical problem by providing a system that preferentially generates data near requestors of the data rather than distributing copies of the information over longer distances.

In an embodiment, a method for managing data in a distributed system is provided. The method may include obtaining, by a content distribution system and from a client device, a request for a first portion of content; making, by the content distribution system, a determination regarding whether the first portion of the content is available from the content distribution system; in a first instance of the determination where the first portion of the content is not available: requesting, by the content distribution system, the first portion of the content from a content serving system; in a first instance of the requesting where the first portion of the content can be generated: initiating, by the content serving system, performance of a cooperative conversion process using a second portion of the content to obtain the first portion of the content; locally caching, by the content distribution system, the first portion of the content; and distributing, by the content distribution system, the first portion of the content to the client device to enable the client device to facilitate performance of desired computer implemented services.

The first portion of the content may be a media file localized for a first region, and the second portion of the content may be the media file localized for a second region.

The media file localized for the first region may be a translated copy of the media file localized for the second region.

Different languages may be predominantly spoken in the first region and the second region.

The cooperative conversion process may include obtaining, by an edge system and from the content distribution system, the second portion of the content; and translating the second portion of the content to obtain the first portion of the content.

The content distribution system, an edge system, and the content serving system may be part of distributed infrastructure.

The content serving system may be part of a data center and the edge system may be part of distributed computing infrastructure for near client device processing.

The content distribution system may be part of the distributed computing infrastructure for caching of data structures to be distributed to client devices.

The request may also specify a desired language for the first content, and different portions of content may be localized for different regions via language translation.

Making the determination may include querying the content distribution system to ascertain whether any language compliant copies of content for the desired language are available.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other types of services that may be provided with a computing device.

To provide the services, information may be distributed across the system. For example, different components of the system may be physically distributed from each other, and may have access to different types of information. Some components may be able to locally obtain the information while others may need to use the information to provide the computer implemented services.

To enable different components to have access to the information for the services, the information may be transmitted via communication systems. For example, various pieces of infrastructure may store copies of the information and distribute copies of the information upon demand.

However, if requested information is unavailable from the infrastructure, then services that depend on access to the information may not be able to be provided. For example, if a user of a data processing system desires to view a media file but the media file is unavailable locally and/or via the infrastructure, then the data processing system may be unable to provide the media file service.

In general, embodiments disclosed herein may provide methods, systems, and/or devices for managing storage and distribution of information to provide computer implemented services. To provide the computer implemented services, any number of client devices 100 may independently and/or cooperatively provide computer implemented services to users of the devices and/or other devices. The information may be stored locally and/or remotely. The information may be of any type and quantity.

When the information is unavailable locally, remote systems may be queried for the information. If the requested information is unavailable from the remote systems, the remote systems may automatically attempt to perform conversion processes on existing information to obtain copies of the requested information. For example, if a media file is requested with a specific localization preference (e.g., for a native language of the region) but no such media file is available, the remote system may automatically perform a conversion process (e.g., translation) of an existing media file that is localized for a different region. Once converted, the newly created localized media file may be distributed to the requesting client device, and/or may be cached so that subsequent requests may be more efficiently serviced.

To provide the above noted functionality, the system of FIG. 1 may include client devices 100, infrastructure 101, and communication system 105. Each of these components is discussed below.

Client devices 100 may provide desired computer implemented services using information from various sources. If the information necessary to provide the computer implemented services is unavailable, then client devices 100 may automatically query infrastructure 101 for the information.

Infrastructure 101 may distribute information to client devices 100. To do so, infrastructure 101 may be distributed and include various devices for locally caching copies of desired information near client devices and other devices for storing primary copies of the desired information. For example, infrastructure 101 may include content distribution system 102, edge system 103, and content serving system 104. Each of these components is discussed below.

Content distribution system 102 may include a distributed system tasked with caching copies of information near client devices 100. When client devices 100 request information from infrastructure 101, the nearest and/or other nearby caches may be checked to see if the information is available. If unavailable, then the request may be forwarded to content serving system 104.

Edge system 103 may be distributed edge system tasked with performing processing to facilitate distribution of information. For example, edge system 103 may translate existing copies of information, and/or otherwise modify other characteristics of information to obtain desired copies of information (e.g., media files in various languages). Once processed, the newly obtained information may be locally cached with content distribution system 102 and/or provided to a requesting client devices.

Content serving system 104 may store primary copies of information, distribute the primary copies to service client requests, and/or initiate conversion processes performed by edge system 103. For example, if content distribution system 102 is unable to supply requested content, then the request may be forwarded to content serving system 104. If the requested content may be obtained by processing existing content cached with content distribution system 102, content serving system 104 may initiate cooperative processing by edge system 103 and content distribution system 102 to obtain a local copy of the desired information. Consequently, even if content serving system 104 stores a copy of the requested information, content serving system 104 may not need to distribute the copy because the desired information may be dynamically generated by edge system 103 and content distribution system 102 (e.g., which are likely to be geographically closer to the requestor, thereby reducing communication bandwidth usage and load on content serving system 104 which may have access to fewer computing resources than content distribution system 102 and/or edge system 103).

Figure 2A:
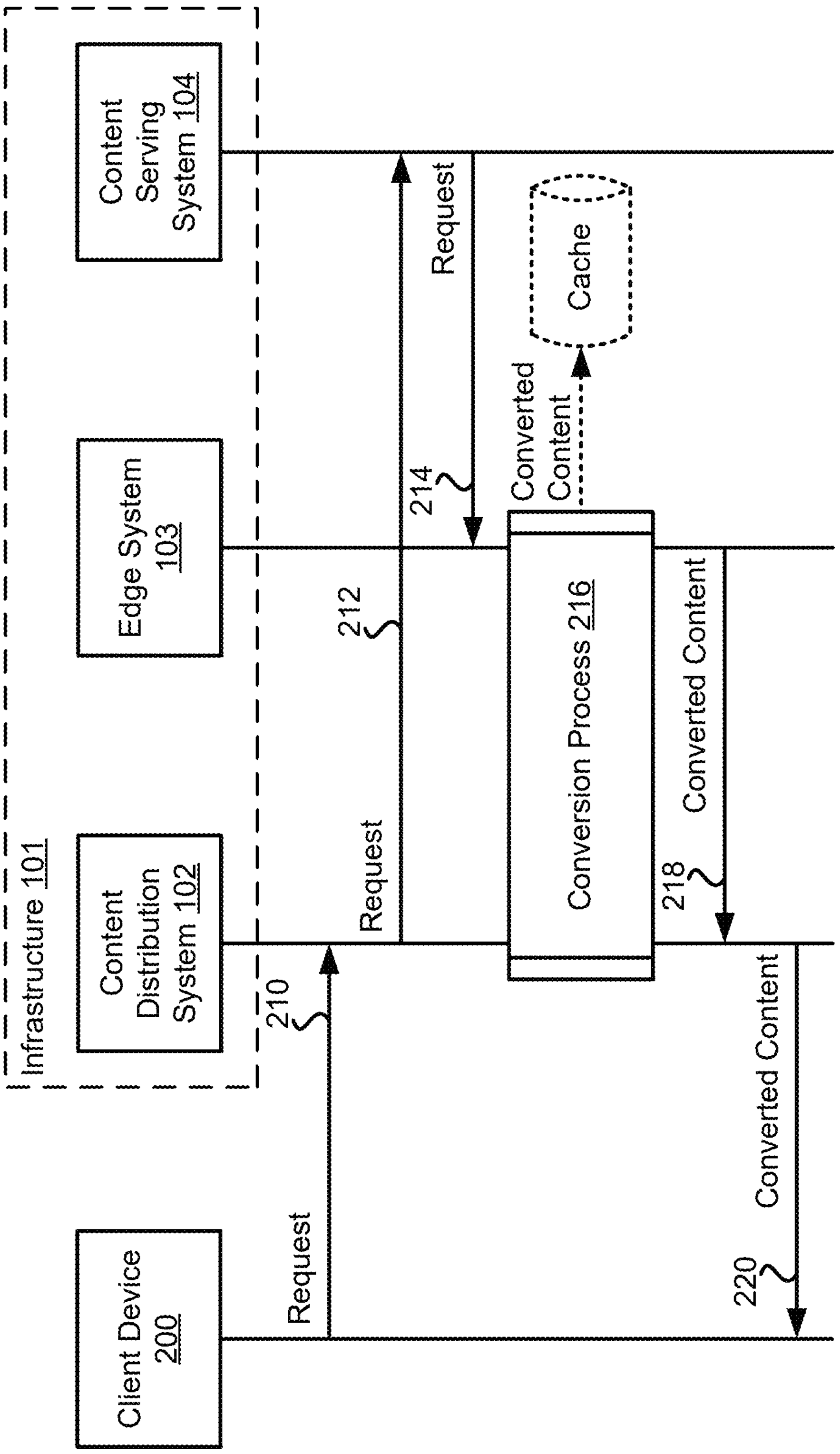
FIGS. 2A-2B show diagrams illustrating interactions in accordance with an embodiment.
Figure 2B:
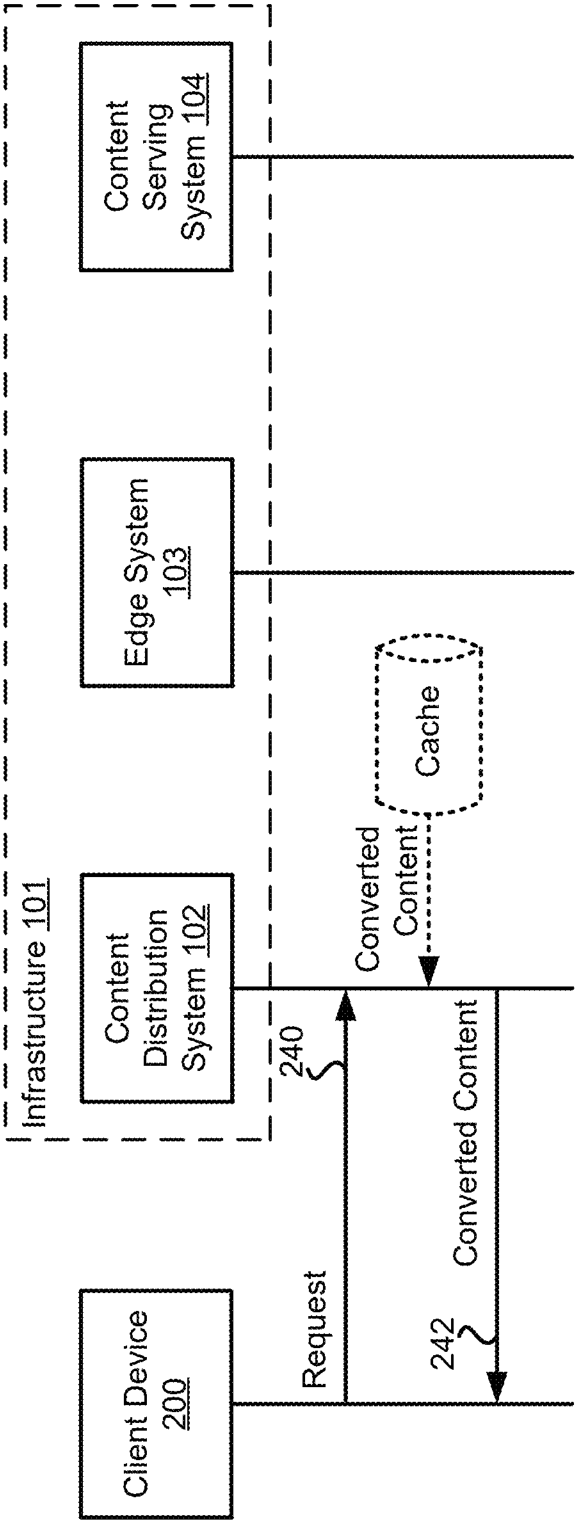
Figure 3:
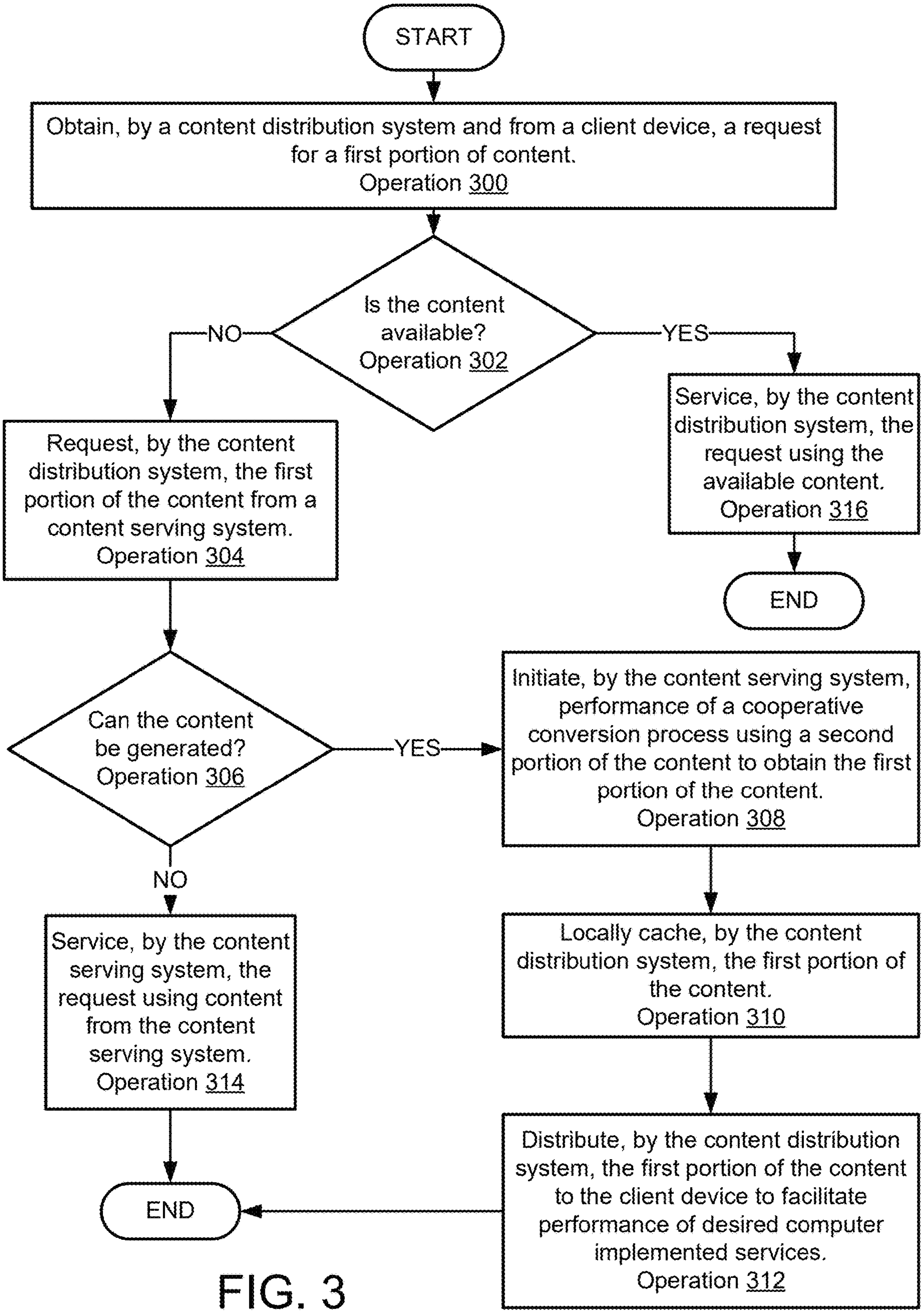
FIG. 3 shows a flow diagram illustrating a method of providing computer implemented services in accordance with an embodiment.

When providing their functionality, any of client device 100 and infrastructure 101 (and/or portions thereof) may perform all, or a portion, of the actions, flows, and methods shown in FIGS. 2A-3.

Any of (and/or components thereof) client device 100 and infrastructure 101 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, interactions diagrams in accordance with an embodiment are shown in FIGS. 2A-2B. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 102, 103, etc.), located towards the top of each figure. Lines descend from these shapes. Processes performed by the components of the system are illustrated using a second set of shapes (e.g., 216, etc.) superimposed over these lines. Interactions (e.g., communication, data transmissions, etc.) between the components of the system are illustrated using a third set of shapes (e.g., 210, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 210 may occur prior to the interaction labeled as 212. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during serving of requests for information.

To service a request for information, at interaction 210, client device 200 may send a request to content distribution system 102. The request may request a portion of information. The request may also specify, for example, localizations, language preferences, and/or other preferences for the information.

If content distribution system 102 has a copy of the requested information in a local cache, then the copy of the requested portion of information may be provided. Refer to FIG. 2B for additional information regarding servicing of requests using local caches.

However, for purposes of this example flow, presume that content distribution system 102 does not have access to any copies of the requested portion of information.

Consequently, at interaction 212, content distribution system 102 forwards the request (and/or generates a new request) to content serving system 104.

Once obtained, content serving system 104 analyzes the request to ascertain (i) whether to service the request using information stored in content serving system 104, or (ii) initiate cooperative processing by content distribution system 102 and/or edge system 103 to dynamically generate a copy of the desired portion of the content. Content serving system 104 may prefer to initiate the cooperative processing when possible.

For example, if the request is for an English language copy of a media file, and content distribution system 102 stores a Spanish language copy of the media file, content serving system 104 may initiate the cooperative processing even if content serving system 104 has access to a copy of the English language media.

To perform the aforementioned analysis, content serving system 104 may track the information stored in content distribution system 102 so that content serving system 104 may ascertain when appropriate information is available for cooperative processing.

For the purposes of this example flow, presume that content serving system 104 determines that cooperative processing is appropriate. Based on the determination, at interaction 214, content serving system 104 may send a request to edge system 103 and/or content distribution system 102. The request may specify (i) a desired portion of information, (ii) an existing copy of cached information stored in content distribution system 102, and/or (iii) processing to be performed on the existing copy of the cached information (e.g., translate a cached media file from Spanish to English).

When received, conversion process 216 may be cooperatively performed by content distribution system 102 and/or edge system 103. During conversion process 216, edge system 103 may obtain a copy of the existing cached information from content distribution system 102 and perform the processing as indicated by content serving system 104. The processing may result in the dynamic generation of a desired portion of information.

Once obtained the converted content (e.g., desired information) may be (i) locally cached (e.g., drawn in dashing to indicate that this is activity that may be performed by content distribution system 102 and/or edge system) and (ii) directed to client device 200 (e.g., the requesting device, may be similar to any of client devices 100).

For example, at interactions 218 and 220, the converted content may be distributed from the edge system 103 to content distribution system 102 and/or client device 200. In this manner, client device 200 may not be required to perform any client side processing and content serving system 104 may likewise not be required to distribute copies of the desired information.

By utilizing resources that are likely to be closer to client device 200, the computing resource cost (e.g., processing cycle, communication bandwidth, etc.) may be reduced. Thus, embodiment disclosed herein may provide an improved computer/computing system that is better able to marshal limited resources for providing desired services. For example, the disclosed system may be able to successfully service higher volumes of requests for information.

Turning to FIG. 2B, a second interaction diagram in accordance with an embodiment is shown. The second interaction diagram may illustrate processes and interactions that may occur during serving of requests for information.

As discussed above, when content has been converted, it may be cached with content distributions system 102. Consequently, when, at interaction 240, a subsequent request for the now-cached information is send to content distribution system 102, content distribution system 102 may, at interaction 242, service the request by providing a copy of the converted content from the cache. Accordingly, no additional overhead for processing by content serving system 104 and/or edge system 103 may be incurred.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures.

Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, the processes and interactions shown in FIGS. 2A-2B may enable higher volumes of information requests to be serviced timely.

As discussed above, the components of FIG. 1 may perform various methods to provide computer implemented services using local and/or remote information. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of providing computer implemented services in accordance with an embodiment is shown. The method may be performed by any of the components of the system of FIG. 1.

At operation 300, a request for a first portion of content is obtained by a content distribution system. The request may be obtained from a client device. The client device may send the request to the contend distribution system. The client device may send the request so that computer implemented services may be provided.

The first content may be a portion of information having particular characteristics such as localization for particular regions where a particular language is predominantly spoken.

At operation 302, a determination is made regarding whether the content is available. The content may be available if the content distribution system has a copy of the content in a local cache (e.g., hosted by a computing device of the content distribution system near the requesting client device).

If the content is not available, then the method may proceed to operation 304. Otherwise, the method may proceed to operation 316.

At operation 304, the first portion of content is requested by the content distribution system and from a content serving system. The first portion of content may be requested by sending a request and/or forwarding the request for the first content.

At operation 306, a determination is made regarding whether the first portion of content can be generated. The determination may be made by ascertain whether the content distribution system has access to other portions of information (e.g., a second portion) that may be used to generate the first portion of information. For example, the content serving system may review records and/or other information regarding the content hosted by the content distribution system.

If the first portion of content can be generated, then the method may proceed to operation 308. Otherwise the method may proceed to operation 314.

At operation 308, performance of a cooperative conversion process using a second portion of the content is initiated to obtain the first portion of the content. The performance may be initiated by the content serving system. The performance may be initiated by sending messages. The messages may indicate (i) the existing content, (ii) the new content to be obtained, and/or (iii) operations to apply to the existing content to obtain the new content.

During the cooperative conversion process, an edge system may obtain the second content from the content distribution system, perform the operations, and initiate caching of the new content (e.g., the first portion of the content) and/or distribution of the new content to a requestor.

At operation 312, the first portion of the content is distributed to the client device (e.g., that requested the first portion of the content) to facilitate performance of desired computer implemented services. For example, the first content may be sent from the edge system, to the content delivery system, and then on to the client device. Once received, the client device may use the first portion of the content to provide desired computer implemented services.

The method may end following operation 312.

Returning to operation 302, the method may proceed to operation 316 when the content is available.

At operation 316, the request is serviced using the available content. For example, the content distribution system may send a copy of the available content to the requesting client device.

The method may end following operation 316.

Returning to operation 306, the method may proceed to operation 314 when the content cannot be generated.

At operation 314, the request is serviced using content stored in the content serving system. For example, the content serving system may send a copy of the first portion of the content to the requesting client device (e.g., via the content distribution system).

The method may end following operation 314.

Using the methods illustrated in FIG. 3, embodiments disclosed herein may facilitate provisioning of computer implemented services in a distributed environment. The services may be facilitated by distributing data desired by client devices. To reduce time to provide the data and/or for other benefits, copies of cache data may be converted near the client devices to reduce, for example, use of network bandwidth. Accordingly, client devices may be more likely to have timely access to data used in computer implemented services.

Figure 4:
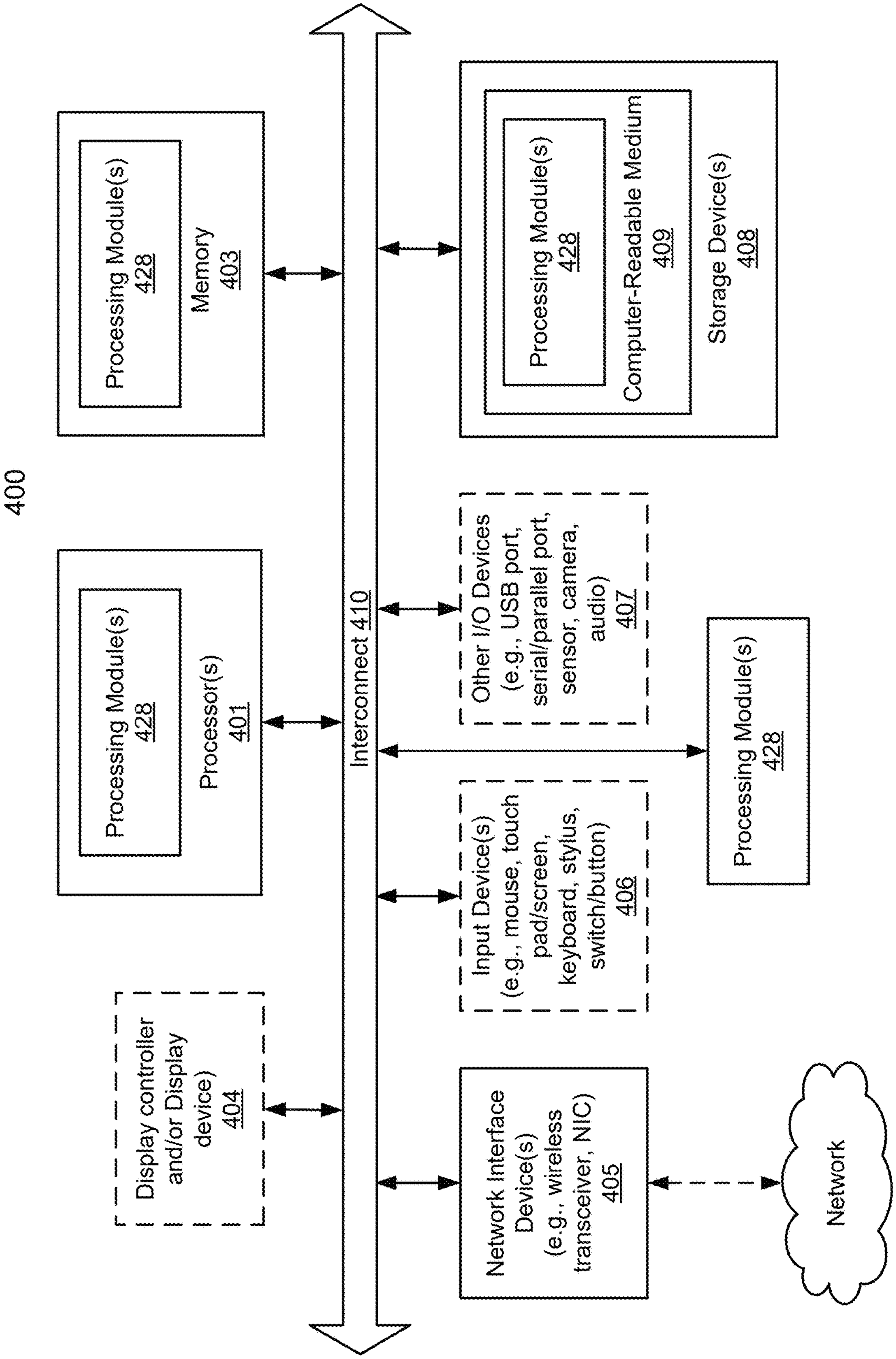
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data in a distributed system, the method comprising:

obtaining, by a content distribution system and from a client device, a request for a first portion of content;

making, by the content distribution system, a determination regarding whether the first portion of the content is available from the content distribution system;

in a first instance of the determination where the first portion of the content is not available:

requesting, by the content distribution system, the first portion of the content from a content serving system;

in response to determining, by the content serving system, that the first portion of the content is both available in the content serving system and can be generated from a second portion of the content available from the content distribution system:

transmitting, by the content serving system to an edge system that is different from the content distribution system, an initiation instruction for performance of a cooperative conversion process using the second portion of the content to obtain the first portion of the content, obtaining, by the edge system and from the content distribution system, the second portion of the content;

translating, by the edge system and not by the content distribution system nor the content serving system, the second portion of the content to obtain the first portion of the content;

locally caching, by the content distribution system, the first portion of the content; and distributing, by the content distribution system, the first portion of the content to the client device to facilitate performance of desired computer implemented services.

2. The method of claim 1, wherein the first portion of the content is a media file localized for a first region, and the second portion of the content is the media file localized for a second region.

3. The method of claim 2, wherein the media file localized for the first region is a translated copy of the media file localized for the second region.

4. The method of claim 3, wherein different languages are predominantly spoken in the first region and the second region.

5. The method of claim 1, wherein the content distribution system, the edge system, and the content serving system are part of distributed infrastructure.

6. The method of claim 5, wherein the content serving system is part of a data center and the edge system is part of distributed computing infrastructure for near client device processing.

7. The method of claim 6, wherein the content distribution system is part of the distributed computing infrastructure for caching of data structures to be distributed to client devices.

8. The method of claim 1, wherein the request further specifies a desired language for the first portion of the content, and different portions of the content are localized for different regions via language translation.

9. The method of claim 8, wherein making the determination comprises querying the content distribution system to ascertain whether any language compliant copies of content for the desired language are available.

10. A non-transitory machine-readable medium having instructions stored therein, which when executed by a processor, cause operations for managing data in a distributed system to be performed, the operations comprising:

obtaining, by a content distribution system and from a client device, a request for a first portion of content;

making, by the content distribution system, a determination regarding whether the first portion of the content is available from the content distribution system;

in a first instance of the determination where the first portion of the content is not available:

requesting, by the content distribution system, the first portion of the content from a content serving system;

in response to determining, by the content serving system, that the first portion of the content is both available in the content serving system and can be generated from a second portion of the content available from the content distribution system:

transmitting, by the content serving system to an edge system that is different from the content distribution system, an initiation instruction for performance of a cooperative conversion process using the second portion of the content to obtain the first portion of the content, obtaining, by the edge system and from the content distribution system, the second portion of the content;

translating, by the edge system and not by the content distribution system nor the content serving system, the second portion of the content to obtain the first portion of the content;

locally caching, by the content distribution system, the first portion of the content; and distributing, by the content distribution system, the first portion of the content to the client device to facilitate performance of desired computer implemented services.

11. The non-transitory machine-readable medium of claim 10, wherein the first portion of the content is a media file localized for a first region, and the second portion of the content is the media file localized for a second region.

12. The non-transitory machine-readable medium of claim 11, wherein the media file localized for the first region is a translated copy of the media file localized for the second region.

13. The non-transitory machine-readable medium of claim 12, wherein different languages are predominantly spoken in the first region and the second region.

14. A system, comprising:

a processor; and a memory coupled to the processor to store instructions, which when executed by the processor, cause operations for managing data in a distributed system to be performed, the operations comprising:

obtaining, by a content distribution system and from a client device, a request for a first portion of content;

making, by the content distribution system, a determination regarding whether the first portion of the content is available from the content distribution system;

in a first instance of the determination where the first portion of the content is not available:

requesting, by the content distribution system, the first portion of the content from a content serving system;

in response to determining, by the content serving system, that the first portion of the content is both available in the content serving system and can be generated from a second portion of the content available from the content distribution system:

transmitting, by the content serving system to an edge system that is different from the content distribution system, an initiation instruction for performance of a cooperative conversion process using the second portion of the content to obtain the first portion of the content, obtaining, by the edge system and from the content distribution system, the second portion of the content;

translating, by the edge system and not by the content distribution system nor the content serving system, the second portion of the content to obtain the first portion of the content;

locally caching, by the content distribution system, the first portion of the content; and distributing, by the content distribution system, the first portion of the content to the client device to facilitate performance of desired computer implemented services.

15. The system of claim 14, wherein the first portion of the content is a media file localized for a first region, and the second portion of the content is the media file localized for a second region.

16. The system of claim 15, wherein the media file localized for the first region is a translated copy of the media file localized for the second region.

17. The system of claim 16, wherein different languages are predominantly spoken in the first region and the second region.

18. The system of claim 14, wherein the content distribution system, the edge system, and the content serving system are part of distributed infrastructure.

19. The system of claim 18, wherein the content serving system is part of a data center and the edge system is part of distributed computing infrastructure for near client device processing.

20. The system of claim 19, wherein the content distribution system is part of the distributed computing infrastructure for caching of data structures to be distributed to client devices.

* * * * *